Oct. 3, 1944.

C. J. T. YOUNG 2,359,456

ANTI-GLARE DEVICE

Filed June 3, 1942

Clinton J. T. Young
INVENTOR.

BY Donald L. Brown
Attorney

Patented Oct. 3, 1944

2,359,456

UNITED STATES PATENT OFFICE 2,359,456

ANTIGLARE DEVICE

Clinton J. T. Young, Cambridge, Mass., assignor to Polaroid Corporation, Cambridge, Mass., a corporation of Delaware Application June 3, 1942, Serial No. 445,573

4 Claims. (Cl. 88—65)

This invention relates to anti-glare devices, and more particularly to polarizing visors adapted for use in connection with automobile headlight systems employing polarized light.

In such systems it has been proposed to provide all automobiles with headlights emitting polarized light of predetermined polarization characteristics, and to equip each automobile also with suitable polarizing visor means adapted to block polarized light from the headlights of another automobile approaching from the front. One difficulty existing in such systems is that the relation between the headlights and analyzers of approaching cars with respect to their transmission axes may be materially altered by irregularities in the road surface, such for example as a high crown. If two approaching cars are materially tipped in opposite directions from a substantially level position, the result will be to rotate the visor in each car from its position of maximum extinction of the headlights of an approaching car with the resulting transmission of a substantial amount of glare-producing light.

It is accordingly one object of the present invention to provide polarizing visor means for an automobile or similar vehicle adapted to compensate for changes from the horizontal in the position of the car wherein it is used.

Another object of the invention is to provide polarizing visor means for a vehicle in the form of a light-polarizing device wherein the transmission axis varies predeterminedly from a mean position of maximum extinction when the visor is in a level position.

A further object is to provide a polarizing visor wherein the transmission axis varies in such manner that the middle portion will substantially block predeterminedly polarized light when the vehicle wherein it is mounted is substantially level, a portion adjacent one end will substantially block said polarized light when said vehicle is tilted in one direction, and a portion adjacent the other end will substantially block said polarized light when said vehicle is tilted in the opposite direction.

A still further object is to provide such polarizing visor means wherein said variation in transmission axis is gradual, whereby said variation may compensate for substantially all degrees of tilting normally encountered.

Other objects and advantages will in part appear and in part be pointed out in the course of the following description of one or more embodiments of the invention, which are given as non-limiting examples, in connection with the accompanying drawing, in which.

Figure 1:
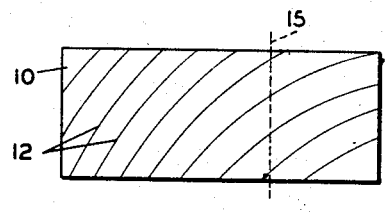
Figure 1 is a diagrammatic view of a sheet of light-polarizing material suitable for use in one embodiment of the invention.

Fig. 1 represents a sheet 10 of light-polarizing material of predeterminedly varying polarizing characteristics. The transmission axis of polarizer 10 is represented by the series of curved lines 12, and it will be noted that said lines vary in direction and curvature across the face of the sheet.

One of the systems of polarized headlighting most often proposed employs headlights and analyzers whose transmission axes are all inclined at an angle of substantially 45 degrees to the horizontal. The polarizer shown in Fig. 1 is suitable for use as an analyzer in such a system. It will be noted that the lines 12 near the center of polarizer 10 are so arranged that tangents thereto will be at angles of approximately 45 degrees to the horizontal, whereas the lines 12 adjacent the ends of polarizer 10 are so arranged that tangents thereto will be at angles of somewhat more or less, respectively, than 45 degrees to the horizontal. For preferred results, the transmission axis should be substantially uniform along any vertical line, when the sheet is in upright position as viewed in Fig. 1. That is to say, all the lines 12 intersected by any arbitrary vertical line 15 should be so arranged that tangents thereto at their respective points of intersection with line 15 should be substantially parallel.

Figure 2:
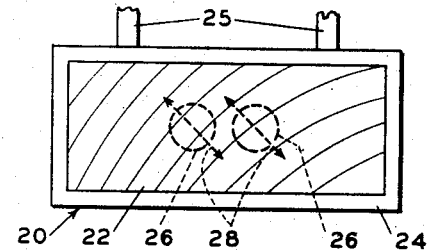
Fig. 2 is a diagrammatic view illustrating the operation of a polarizing visor embodying polarizing material of the type shown in Fig. 1 and illustrating particularly the operation of such a visor when the car wherein it is mounted is in level position.

Fig. 2 represents a polarizing visor 20 comprising a polarizing member 22 similar to sheet 10 and a mounting frame or rim 24 provided with conventional brackets 25 for mounting within an automobile. It will be understood that polarizer 22 may, if desired, be laminated in conventional fashion between cover plates of glass or a suitable transparent plastic.

Fig. 2 illustrates the operation of visor 20 when the car wherein it is mounted is on a level road. Dotted circles 26 represent the polarizing headlights of an approaching car, and arrows 28 represent the transmission axes of said headlights. Since both cars are substantially level, the driver of the car wherein visor 20 is mounted will normally assume a position such as to interpose the middle part of visor 20 between his eyes and the headlights of the approaching car. That is to say, the result will be that the light from headlights 26, which will be vibrating substantially at 45 degrees to the horizontal, will simimpinge upon that part of polarizing layer 22 whose axis is approximately at 45 degrees to the horizontal and will accordingly be substantially blocked thereby.

Figure 3:
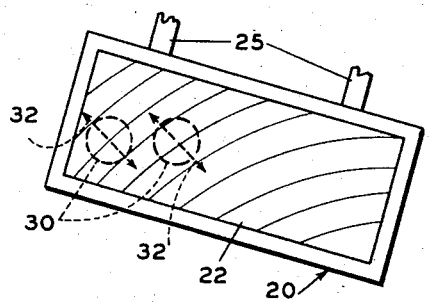
Fig. 3 is a view similar to Fig. 2 but showing the operation of the visor when the car wherein it is mounted is tilted to the right.

Fig. 3 illustrates the operation of visor 20 when the car wherein it is mounted is tilted downward at the right. Dotted circles 30 represent the polarizing headlights of an approaching car the transmission axes of which are represented by arrows 32. In this case the driver of the car wherein visor 20 is mounted will assume a position such that the left hand portion of polarizing layer 22 will intercept the light from headlights 30, and since said portion of polarizer 22 has its transmission axis most nearly crossed with the transmission axes of polarizers 30 when the car is in tilted position, it will accordingly accomplish maximum extinction thereof.

Figure 4:
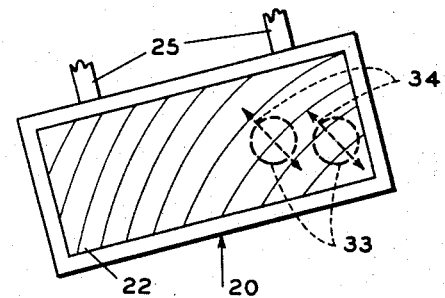
Fig. 4 is a view similar to Fig. 2 but showing the operation of the visor when the car wherein it is mounted is tilted to the left.

The converse of the case shown in Fig. 3 is illustrated in Fig. 4, which illustrates the operation of visor 20 when the car wherein it is mounted is tilted upward at the right. In this case, when the driver approaches a car provided with polarizing headlights 33 whose transmission axes are represented by arrows 34, he will view said lights through the right hand end of polarizer 22 and thereby obtain maximum extinction. It will of course be understood that there may be tilting of the approaching car, but for the sake of simplicity this is not shown in Figs. 2–4.

It should be noted that a material advantage of the visor of the invention lies in the fact that when it is in use in a vehicle the driver will naturally tend to look through the proper portion. That is to say, under normal conditions the position which the driver will naturally tend to assume within the vehicle will be such that he will look through that part of the visor adapted to produce maximum extinction of the headlights of an approaching car. For example, if the car is in level position as indicated in Fig. 2, the driver will be sitting in a substantially vertical position and will accordingly tend to look through the central portion of visor 20. When the car tilts downward at the right as indicated in Fig. 3, the driver will tend to tilt the other way to regain a vertical position, with the result that he will look through the left hand or uppermost end of the visor. Similarly, when the car tilts upward at the right the driver will tend to tilt to the right and thereby bring his eyes opposite the right hand end of visor 20. The same is true for lesser degrees of tilting than those diagrammatically illustrated in Figs. 3 and 4.

The amount of variation in the inclination of the axis of sheet 10 or polarizer 22 may vary, depending upon the maximum amount of tilt for which it is desired to compensate. Preferably, allowance should also be made for the fact that an approaching car will in all probability be tilted to approximately an equal degree in the opposite direction, thus producing an equal amount of tilt in the transmission axis of its headlights. For example, in order to compensate for a maximum tilt for one car of 10 degrees in each direction, the transmission axis of polarizer 22 in Figs. 2–4 should be at approximately 25 degrees to the horizontal adjacent its right-hand end and at approximately 25 degrees to the vertical adjacent its left-hand end. Under most conditions of driving and road bed, however, it will be noted that tilting of a car downward along its right side occurs very much more often than along its left side, except on banked curves, in which case an approaching car will be similarly tilted to a compensating degree. Accordingly, it will be seen that for use under normal conditions, the variation in axis may be much greater between the portion of the visor used for level driving and its left-hand end than between said normal driving portion and the right-hand end. It may therefore be desirable, particularly if the visor is to be used on relatively highly crowned roads, to construct the polarizer so that the portion used for level driving will be adjacent its right-hand end as viewed by the driver, with a correspondingly increased degree of variation in transmission axis between said portion and the left-hand end of the visor.

A sheet of polarizing material 10 of the polarizing properties illustrated by lines 12 may be made in a number of ways and may advantageously comprise, for example, either a suspension of suitably oriented polarizing particles such as crystals of herapathite in a transparent suspending medium such as cellulose acetate or a molecularly oriented plastic such as polyvinyl alcohol treated as by staining or dyeing to render it dichroic, for example, as disclosed in Patent No. 2,173,304 or Patent No. 2,237,567. The desired varying degree of orientation necessary to obtain a varying transmission axis of the characteristics illustrated by lines 12 may be produced, for example, by subjecting the sheet of polarizing material to a suitable orienting force such as a variable stretch. As another example, sheet 10 may be formed by smearing a viscous suspension of polarizing particles against a suitable support and causing the smearing element to follow approximately the directions indicated by lines 12. Other ways of accomplishing the desired results will doubtless be apparent to those skilled in the art and are to be construed as coming within the scope of the invention.

Figure 5:
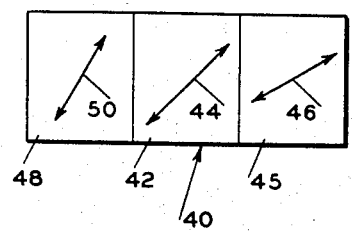
Fig. 5 is a view similar to Fig. 1 showing a modified polarizing element suitable for use in the practice of the invention.

Fig. 5 illustrates a modified arrangement of light-polarizing material which may be substituted for polarizer 22 in visor 20. In Fig. 5 sheet 40 comprises three sections, a central section 42 whose transmission axis is arranged at substantially 45 degrees to the horizontal as illustrated by arrow 44, a right-hand section 45 whose transmission axis is arranged at an angle of somewhat less than 45 degrees to the horizontal as illustrated by arrow 46, and a left-hand section 48 whose transmission axis is arranged at an angle of somewhat more than 45 degrees to the horizontal as illustrated by arrow 50. By way of illustrative example, it may be assumed that arrows 46 and 50 each makes an angle of 5 degrees with arrow 44, but it will be understood that the invention is in no way limited to such a specific angular difference. Furthermore, sheet 40 may include more sections than the three indicated in Fig. 5, and other modifications of the invention capable of operating in the preferred manner described will doubtless be apparent to those skilled in the art and are to be construed as coming within the scope of the invention.

As will be apparent from the foregoing description and from the drawing, the visor of the preferred embodiment of the invention is a flat, substantially rectangular or elliptical element positioned with its long dimension substantially horizontal and with its polarizing axis making varying angles with the said long dimension.

Since certain changes may be made in the above construction, and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In a vehicle, a polarizing viewing visor adapted for viewing linearly polarized light of predetermined polarization characteristics, said visor comprising a sheet of light polarizing material, said polarizing material being substantially uniformly oriented vertically in the plane of said sheet, but having the direction of orientation thereof varying horizontally in the plane of said sheet, said variation being substantially clockwise from left to right, across the face of said visor, with respect to the driver of said vehicle, said variation being such that a portion of said visor is capable of substantially blocking predeterminedly polarized light when said vehicle is in a substantially level position and another portion adjacent the left-hand side of said first-named portion is capable of substantially blocking said predeterminedly polarized light when said vehicle is tilted downwardly along the right-hand side thereof.

2. In a vehicle, a polarizing viewing visor adapted for viewing linearly polarized light of predetermined polarization characteristics, said visor comprising a sheet of light polarizing material, said polarizing material being substantially uniformly oriented vertically in the plane of said sheet, but having the direction of orientation thereof varying horizontally in the plane of said sheet, said variation being substantially clock-wise from left to right, across the face of said visor, with respect to the driver of said vehicle, said variation being substantially uniformly gradual across the face of said visor and being such that a central portion of said visor is capable of substantially blocking said predeterminedly polarized light when said vehicle is in a substantially level position, a portion adjacent the left-hand side of said visor is capable of substantially blocking said predeterminedly polarized when said vehicle is tilted downwardly along the right-hand side thereof, and a portion adjacent the right-hand side of said visor is capable of substantially blocking said predeterminedly polarized light when said vehicle is tilted upwardly along the right-hand side thereof.

3. In an automotive vehicle or the like, in combination, a visor comprising a sheet of light polarizing material, and mounting means for positioning said visor before the eyes of the driver of said vehicle, a portion of said polarizing material, when said visor is in said position, having the transmission axis thereof arranged at an angle of substantially 45° to the horizontal, and an adjacent portion of said polarizing material laterally disposed with respect to said first-named portion having the transmission axis thereof arranged at an angle to the horizontal slightly different from 45°, said first-named portion being adapted to block polarized light vibrating at an angle of substantially 45° to the horizontal in the opposite sense from the transmission axis of said portion when said vehicle is in a substantially level position, and said second-named portion being adapted to block said polarized light when said vehicle is tilted downwardly along the right-hand side thereof.

4. In an automotive vehicle or the like, a visor comprising a substantially flat, sheet-like, rectangular light polarizer, and mounting means for positioning said visor before the eyes of the driver of said vehicle, a portion of said polarizer positioned substantially midway thereof and extending vertically from side to side thereof, when said visor is in said position, having the transmission thereof arranged at an angle of substantially 45° to the horizontal, a portion adjacent one side of said first-named portion having the transmission axis thereof arranged at an angle of slightly more than 45° to the horizontal, and a portion adjacent the other side of first-named portion having the transmission axis thereof arranged at an angle of slightly less than 45° to the horizontal, said first-named portion being adapted to block polarized light vibrating at an angle of substantially 45° to the horizontal in the opposite sense when said vehicle is in a substantially level position, one of said side portions being adapted to block said polarized light when said vehicle is tilted downwardly along the right-hand side thereof, and the other of said side portions being adapted to block said polarized light when said vehicle is tilted upwardly along the right-hand side thereof.

CLINTON J. T. YOUNG.